(12) United States Patent
Goodwin et al.

(10) Patent No.: US 8,413,048 B1
(45) Date of Patent: *Apr. 2, 2013

(54) PROCESSING DIGITAL IMAGES INCLUDING HEADERS AND FOOTERS INTO REFLOW CONTENT

(75) Inventors: Robert L. Goodwin, Mercer Island, WA (US); Troy N. Terry, Bellevue, WA (US); Adam Brian Coath, Seattle, WA (US); Frederick Ziya Ramos Akalin, Seattle, WA (US); Joshua Shagam, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/797,510

(22) Filed: Jun. 9, 2010

Related U.S. Application Data

(63) Continuation of application No. 11/392,999, filed on Mar. 28, 2006, now Pat. No. 7,788,580.

(51) Int. Cl.
*G06F 17/00* (2006.01)
*G06F 17/20* (2006.01)
*G06F 17/21* (2006.01)

(52) U.S. Cl. ........ 715/243; 715/244; 715/245; 715/246; 715/247

(58) Field of Classification Search ........... 715/243–247
See application file for complete search history.

(56) References Cited

U.S. PATENT DOCUMENTS

| 4,741,045 | A |   | 4/1988 | Denning |
|---|---|---|---|---|
| 5,029,107 | A |   | 7/1991 | Lee |
| 5,285,526 | A |   | 2/1994 | Bennett et al. |
| 5,590,257 | A |   | 12/1996 | Forcier |
| 5,671,438 | A |   | 9/1997 | Capps et al. |
| 5,774,580 | A |   | 6/1998 | Saitoh |
| 5,784,487 | A | * | 7/1998 | Cooperman ............ 382/175 |
| 5,850,490 | A | * | 12/1998 | Johnson ............... 715/210 |
| 5,860,074 | A |   | 1/1999 | Rowe et al. |
| 5,907,631 | A |   | 5/1999 | Saitoh |
| 5,978,819 | A |   | 11/1999 | Berstis |

(Continued)

FOREIGN PATENT DOCUMENTS

| EP | 1343095 A2 | 9/2003 |
|---|---|---|
| JP | 07-192084 A | 7/1995 |

(Continued)

OTHER PUBLICATIONS

Boychuk, B., Shortcovers for iPhone Review, Macworld.com, http://www.macworld.com/article/141540/2009/07/shortcovers.html, Jul. 6, 2009, pp. 3.

(Continued)

*Primary Examiner* — Chau Nguyen
(74) *Attorney, Agent, or Firm* — Knobbe, Martens, Olson & Bear LLP

(57) ABSTRACT

A computer system and method for processing a digital image into reflow content is presented. A computer system includes a processor and a memory. The computer system is configured to process a digital image by first obtaining the digital image, wherein the digital image includes at least some content suitable for conversion into reflow content. The computer system identifies any headers or footers that exist within the digital image. The computer system then processes the digital image into reflow content, excluding any content within an identified header or footer. Headers and/or footers are identified according to one or more aspects indicative of a header/footer, such as separating white space, a separator line, sequences indicative of page numbering, and the like.

23 Claims, 12 Drawing Sheets

U.S. PATENT DOCUMENTS

| | | | |
|---|---|---|---|
| 6,002,798 | A | 12/1999 | Palmer et al. |
| 6,032,163 | A | 2/2000 | Tou et al. |
| 6,256,610 | B1 * | 7/2001 | Baum .......................... 704/260 |
| 6,377,704 | B1 | 4/2002 | Cooperman |
| 6,487,570 | B1 | 11/2002 | Forcier |
| 6,510,243 | B1 | 1/2003 | Ikeda |
| 6,766,495 | B1 | 7/2004 | Bates et al. |
| 6,915,484 | B1 | 7/2005 | Ayers et al. |
| 6,956,587 | B1 | 10/2005 | Anson |
| 7,171,061 | B2 | 1/2007 | Sarkar et al. |
| 7,213,035 | B2 | 5/2007 | Ornstein et al. |
| 7,219,309 | B2 | 5/2007 | Kaasila et al. |
| 7,272,258 | B2 | 9/2007 | Berkner et al. |
| 7,362,311 | B2 | 4/2008 | Filner et al. |
| 7,392,472 | B2 | 6/2008 | Simard et al. |
| 7,412,647 | B2 | 8/2008 | Sellers et al. |
| 7,433,548 | B2 | 10/2008 | Goodwin et al. |
| 7,460,710 | B2 | 12/2008 | Coath et al. |
| 7,469,388 | B1 | 12/2008 | Baudisch et al. |
| 7,486,628 | B1 | 2/2009 | Brisebois et al. |
| 7,870,503 | B1 | 1/2011 | Levy et al. |
| 2002/0052898 | A1 | 5/2002 | Schilit et al. |
| 2002/0191847 | A1 | 12/2002 | Newman et al. |
| 2003/0014445 | A1 * | 1/2003 | Formanek et al. ............ 707/526 |
| 2003/0126558 | A1 | 7/2003 | Griffin |
| 2003/0128234 | A1 | 7/2003 | Brown et al. |
| 2003/0135649 | A1 | 7/2003 | Buckley et al. |
| 2004/0004641 | A1 | 1/2004 | Gargi |
| 2004/0103371 | A1 | 5/2004 | Chen et al. |
| 2004/0114814 | A1 * | 6/2004 | Boliek et al. .................. 382/233 |
| 2004/0139384 | A1 * | 7/2004 | Lin ................................ 715/500 |
| 2004/0146199 | A1 * | 7/2004 | Berkner et al. ............... 382/176 |
| 2004/0202352 | A1 | 10/2004 | Jones |
| 2004/0205568 | A1 | 10/2004 | Breuel et al. |
| 2005/0125549 | A1 | 6/2005 | Katayama |
| 2005/0128516 | A1 | 6/2005 | Tomita |
| 2005/0234893 | A1 * | 10/2005 | Hirsch .............................. 707/3 |
| 2006/0005116 | A1 | 1/2006 | Ferguson et al. |
| 2006/0181742 | A1 | 8/2006 | Lech et al. |
| 2006/0227153 | A1 | 10/2006 | Anwar et al. |
| 2006/0282838 | A1 | 12/2006 | Gupta et al. |
| 2006/0288278 | A1 | 12/2006 | Kobayashi |
| 2006/0288279 | A1 | 12/2006 | Yacoub et al. |
| 2007/0061704 | A1 | 3/2007 | Simova et al. |
| 2007/0112810 | A1 | 5/2007 | Jonsson |
| 2008/0267535 | A1 | 10/2008 | Goodwin et al. |

FOREIGN PATENT DOCUMENTS

| | | |
|---|---|---|
| JP | 2004005453 A | 1/2004 |
| JP | 2004532430 T | 10/2004 |
| WO | WO 02/089105 A2 | 11/2002 |

OTHER PUBLICATIONS

Lin, Lin X., Header and Footer Extraction by Page-Association, Hewlett-Packard Company, May 6, 2002, pp. 1-8, Palo Alto, California, U.S.

Montanés, E., et al., Towards Automatic and Optimal Filtering Levels for Feature Selection in Text Categorization, Advances in Intelligent Data Analysis VI, Sep. 2005, pp. 239-248.

PDF Reference Fifth Edition, Adobe Portable Document Format Version 1.6, Chapter 5.9, Adobe Systems Incorporated, 1985-2004, pp. 440-446.

Taghva et al., The Impact of Running Headers and Footers on Proximity Searching, Information Science Research Institute, University of Nevada, 2004, pp. 5, Las Vegas, Nevada, U.S.

Cattoni, R., et al., Geometric Layout Analysis Techniques for Document Image Understanding: A Review, Retrieved from the Internet: URL:http://tev.itc.it/people/modena/Papers/DOC_SEGstate.pdf [retrieved on Jan. 29, 2003, 1998.

Boychuk, B., Shortcovers for iPhone Review, Macworld.com, http://www.macworld.com/article/141540/2009/07/shortcovers.html, Jul. 6, 2009, pp. 3.

Lin, X. Header and Footer Extraction by Page-Association, Hewlett-Packard Company, May 6, 2002, pp. 1-8, Palo Alto, California, U.S.

* cited by examiner

800

Chapter 10: Scanning Line Art and Halftones

It's easy when looking at line art at a 1:1 ratio to go crazy and try to fix every minor defect along the edges of lines to make them all perfectly straight. Keep in mind, though, the depth you're seeing things at. Now, we're not saying that you should do a half-baked job of correcting your line art; we're just saying, keep in mind how long things are taking and what level of quality you're getting back. We're in this for the money. If you ever have any questions about the quality of your lines, print a laser. It's probably not as bad as you think.

Working with Difficult Line Art

No matter how good a job you do exploring your scanner's controls for line art, some line art will simply refuse to be scanned correctly. This is a time when you have to step in and take some decisions out of your scanner's hands.

Selective Reverting to Saved

It's worth mentioning here that the Rubber Stamp also can stamp from the saved version of your file as well. Just choose From Saved in that same Rubber Stamp option palette. If reverting to saved will ruin a lot of good work, consider just stamping part of the old file into place.

The Eraser tool also does this quite nicely. As you might be able to deduce, double-clicking the Eraser tool brings up the Eraser tool options, which contains the Erase to Saved button. Keep in mind that the Eraser Tool's area of effect is driven by brush size. That's the palette behind the Tool options palette for both the Paintbrush and Eraser tools. Choose a diffuse one that's not too big when you're working on anything but line art.

802

Lost Detail

When your scanner is in line art mode, it is looking at each sample it takes and deciding whether to make that sample black or not. If the sample is 50 percent gray or more, it makes it black. Otherwise, it makes it white. When lines are lighter, they simply don't show up in the scan. The first thing to do is to scan the line art in grayscale mode. Scan it at the resolution you intend to print the line art at, 1200 pixels. This results initially in a very large file. Each of the pixels,

*Fig. 8.*

PROCESSING DIGITAL IMAGES INCLUDING HEADERS AND FOOTERS INTO REFLOW CONTENT

CROSS-REFERENCE TO RELATED APPLICATION

This application is a continuation of U.S. patent application Ser. No. 11/392,999, entitled "PROCESSING DIGITAL IMAGES INCLUDING HEADERS AND FOOTERS INTO REFLOW CONTENT", and filed on Mar. 28, 2006, the entirety of which is incorporated herein by reference.

FIELD OF THE INVENTION

The present invention is directed to processing digital images of content and, more particularly, to processing digital images into digital reflow content including both non-reflow and reflow content.

BACKGROUND

As more and more users turn to computer networks such as the Internet and particularly the World Wide Web (hereinafter the "Web") for information, content providers are increasingly converting traditional content (e.g., printed materials such as books, magazines, newspapers, newsletters, manuals, guides, references, articles, reports, documents, and the like) to electronic form.

For some content providers, a quick and simple way to convert printed content to an electronic form for publication is to create a digital image of the printed content, i.e., a digital image containing representation of text. As those skilled in the art will appreciate, this type of conversion is typically performed through the use of a scanner. However, while simply generating a digital image (or images) of printed content can be accomplished quickly, the resulting digital images might not be particularly well suited for various scenarios. For example, digital images corresponding to the conversion of pages of a book into electronic form may not be well suited in some viewing scenarios. Of course, the reasons that a digital image is not always an optimal form/format of delivery are many, but include issues regarding the clarity or resolution of digital images, the large size of a digital image file and, perhaps most importantly, the rendering of the digital images on various sized displays. For example, traditional digital images may be of a fixed size and arrangement such that a computer user must frequently scroll his or her viewer to read the text. In other words, text in a digital image is not reflowable with regard to the boundaries of the viewer.

Another approach to converting printed content into a digital form relates to converting the print images into corresponding digital text. Digital text comprises values corresponding to a printable character set, including alphanumeric characters. Exemplary character sets include the ASCII, EBCDIC, and Unicode character sets. However, converting printed content into digital text requires greater effort on the part of the content provider than simply generating a digital image. More particularly, the content provider must first generate (at least temporarily) a digital image of the content and then convert the text in the digital image into digital text using optical character recognition (OCR) software. As those skilled in the art will appreciate, OCR software scans a digital image and, in so doing, identifies digital characters from the pixels in the digital image. Unfortunately, OCR software can and often does make mistakes when matching collections of pixels to corresponding characters.

One approach to converting printed content into reflow digital content relates to processing content in a digital image into identifiable segments. An example of such an approach is set forth in co-pending and commonly assigned patent application Ser. No. 11/392,213 entitled "Method and System for Converting a Digital Image Containing Text to a Token-Based File for High-Resolution Rendering," filed Mar. 28, 2006, which is incorporated herein by reference. As described therein, the content in a digital image is broken up into "glyphs," e.g., identifiable segments of content. In turn, the glyphs can be scaled and/or reflowed within the boundaries of a viewer. Generally described, "reflow" relates to the adjustment of line segmentation and arrangement for a set of segments. Digital content that can be rearranged according to the constraints of a particular viewer and without scaling can "reflow" within the viewer, and is reflow content.

With any automated conversion process the accuracy and presentation of the digital content is important. This is especially true for content providers who intend to offer their converted printed content for money. Unfortunately, nearly all printed content includes regions or blocks in the content which, if included in the reflow body of content or modified from a particular spatial arrangement, could corrupt the converted reflow content or otherwise degrade the visual presentation of the converted content. Examples of these types of "non-reflow" regions/blocks include, but are not limited to, headers, footers, sidebars, graphs, graphics, mathematical equations, tables, program listings, bulleted or numbered lists, poetry, and, in general, regions in which the spatial arrangement of the content (textual or otherwise) is important to that content.

In regard to "non-reflow" blocks of content, it should be understood that this term is used generically in regard to blocks of content that, for one reason or another, should not be "reflowed," irrespective of the reason that the block of content should not be reflowed. More particularly, the term "non-reflow blocks of content" include both out-of flow blocks of content (where the content is related to but falls outside of the regular flow of content, including sidebars, headers, and footers) and spatial-dependent non-reflow blocks of content (where the spatial arrangement of the content precludes it from being reflowed) such as scientific formulas, lists, tables, and the like.

Quite frequently, non-reflow blocks can include some textual content. In these circumstances, the inclusion of the textual content with the reflow body of content can corrupt the integrity of the content. To further illustrate this point, FIG. 1 is a pictorial diagram illustrating a digital image 100 of printed content that includes both reflow and non-reflow blocks of content. More particularly, digital image 100 includes two paragraphs of text, paragraphs 102 and 104, which generally represent the reflow content of the digital image 100. Additionally, digital image 100 includes various non-reflow regions/blocks, including header 106, caption 108, graphic 110, separator line 112, and footnote 114, which is referenced from the text via footnote number 116.

With regard to content from non-reflow blocks corrupting the integrity of reflow content, the first sentence of paragraph 102, including text (not shown) from the previous page of content, if converted correctly, should read as follows:

> Half the information has been used to pad and rearrange (modulate) the data in sequences and patterns designed to be accurately readable as a string of pulses.

However, if the "text" of header 106 were to be erroneously included into/with the reflow content of paragraph 202, the above sentence would read:

Half the information has been used to pad and rearrange (modulate) the data in 180 Chapter 4 sequences and patterns designed to be accurately readable as a string of pulses.

Clearly, adding "180 Chapter 4" to the reflow content corrupts the converted content and creates a scenario that would merely confuse a reader. As can be seen from this simple example, keeping the data of non-reflow blocks (such as header 106) from corrupting the reflow content is critical to the integrity of the converted content. More generally, excluding content in non-reflow blocks from being processed in the conversion of the general reflow content of a digital image 100 is essential to the integrity of the resultant digital content.

Unfortunately, creating automated procedures for detecting non-reflow blocks of content, especially when the non-reflow blocks of content include textual content that could be converted as reflow content, has proven to be elusive. As such, manual editing is currently required to edit/finalize the converted digital content before it can be presented for "consumer" use.

Aspects of the present invention are directed at identifying and processing non-reflow blocks of content, and particularly in identifying headers and footers, in a digital image 100 such that the reflow content can be converted without corruption by the content of the non-reflow blocks. Other aspects of the present invention are further directed at identifying converted content that requires manual editing, thereby focusing and reducing the amount of manual editing to be performed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to aspects of the present invention, a computer system for processing a digital image into reflow content is presented. The computer system includes a processor and a memory. The computer system is configured to process a digital image by first obtaining the digital image, wherein the digital image includes at least some content suitable for conversion into reflow content. The computer system identifies any headers or footers that exist within the digital image. The computer system then processes the digital image into reflow content, excluding any content within an identified header or footer.

According to certain aspects, headers are identified by locating the topmost one or more lines of content on a page of the digital image that are separated by white space of a greater amount than is found between paragraphs of reflow content. According to other aspects, footers are identified by locating the bottommost one or more lines of content in a page of the digital image where the one or more lines are separated by white space of a greater amount than is found between paragraphs of reflow content.

According to additional aspects of the present invention, a method for processing a digital image into a digital content file is presented. The method comprises each of the following. A digital image is obtained. The digital image includes at least some content suitable for conversion to reflow content. Any headers or footers within the digital image are identified. The content of the digital image is processed into reflow, excluding the content in the identified headers and footers. Thereafter, the processed reflow content is stored into a digital content file.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a pictorial diagram illustrating a digital image including a sidebar;

DETAILED DESCRIPTION

The following detailed description provides exemplary implementations of the invention. Although specific system configurations and flow diagrams are illustrated, it should be understood that the examples provided are not exhaustive and do not limit the invention to the precise forms disclosed. Persons having ordinary skill in the field of computers, digital imaging, and content conversion, will recognize components and process steps described herein that may be interchangeable with other components or steps, or combinations of components or steps, and still achieve the benefits and advantages of the present invention. Moreover, in the following description, numerous specific details are set forth in order to provide a thorough understanding of the invention. It will be apparent to one skilled in the art, however, that the invention may be practiced without some or all of these specific details. In other instances, well-known process steps have not been described in detail in order not to unnecessarily obscure the invention.

It should also be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

With regard to digital images, while a typical digital image is a raster- or vector-based file, such as PEG and TIFF files, the present invention is not so limited. More particularly, in addition to processing raster- and/or vector-based images, the present invention may convert other types of digital images, such as PDF images that, in addition to pixel-based information, may or may not include text and/or textual formatting information. Accordingly, while the subsequent discussion is made in regard to digital images generally, it should be appreciated that it may include many types of digital image content.

Figure 2:
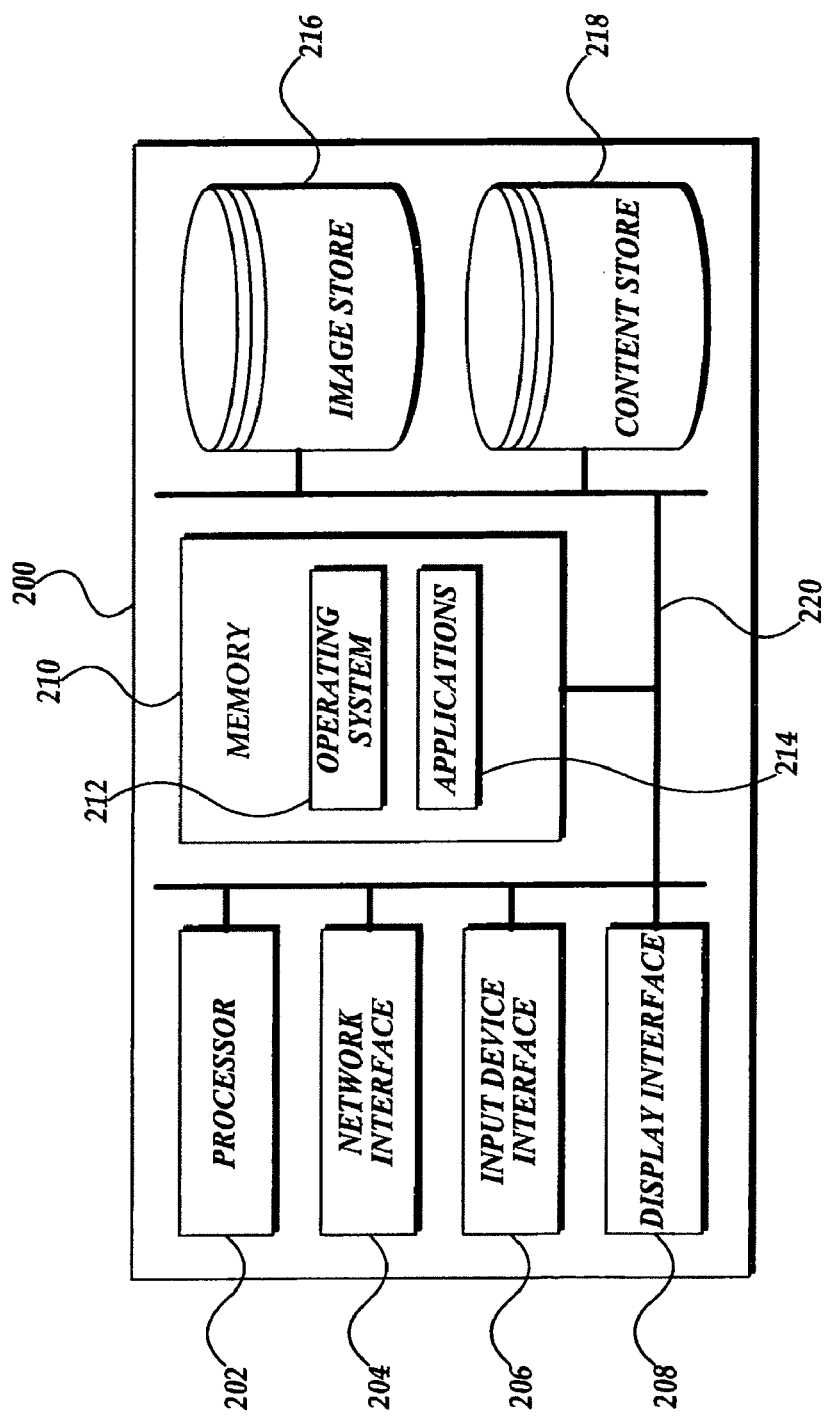
FIG. 2 is a pictorial diagram showing an exemplary computing environment in which embodiments of the invention may be implemented.

Processing digital images that include both reflow capable ("reflow blocks") and non-reflow capable ("non-reflow blocks") blocks of content may be conducted on a variety of computing devices and configurations. These computing devices include, but are not limited to, laptop or tablet computers, personal computers, workstations, mini- and mainframe computers, and the like. These computing devices may also include specially configured computers for processing digital images. However, the general architecture of a suitable computing device is described below in regard to FIG. 2. More particularly, FIG. 2 is a block diagram illustrating exemplary components of a computing device 200 suitable for processing a digital image having both reflow and non-reflow blocks of content. However, the following description of the exemplary components of a computing device 200 should be viewed as illustrative only and not construed as limiting in any manner.

With regard to FIG. 2, the exemplary computing device 200 includes a processor 202 in communication with a variety of other components over a system bus 220. These other components include, by way of example, a network interface 204, an input device interface 206, a display interface 208, and a memory 210. As appreciated by those skilled in the art, the network interface 204 enables the computing device 200 to communicate data, control signals, data requests, and other information with other resources including computers, data sources, storage devices, and the like, on a computer network such as the Internet (not shown). The network interface 204 may be configured to communicate via wired or wireless connections. As one skilled in the art will appreciate, the computing device 200 may obtain a digital image, such as digital image 100 from another computer, a storage device, or other source via the computer network, as well as save the processed converted content to a networked location or send it to another computer on the network.

The input device interface 206, sometimes also embodied as an input/output interface, enables the computing device 200 to obtain data input from a variety of devices including, but not limited to, a digital pen, a touch screen, a keyboard, a mouse, a scanner, and the like. In addition to the exemplary components described above, a display interface 208 is used for outputting display information to a computer user. Typically, the display information is output by the display interface 208 via a display device (e.g., a CRT monitor, an LCD screen, a television, an integrated screen or sets of screens, etc.). Of course, while not shown, one skilled in the art will appreciate that a display device may be incorporated as an integral element within a computing device 200.

The processor 202 is configured to operate in accordance with programming instructions stored in a memory 210. The memory 210 generally comprises RAM, ROM, and/or other permanent memory. Thus, in addition to storage in read/write memory (RAM), programming instructions may also be embodied in read-only format, such as those found in ROM or other permanent memory. The memory 210 typically stores an operating system 212 for controlling the general operation of the computing device 200. The operating system may be a general purpose operating system such as a Microsoft Windows® operating system, a UNIX® operating system, a Linux® operating system, or an operating system specifically written for and tailored to the computing device 200. Similarly, the memory 210 also typically stores user-executable applications 214, or programs, for conducting various functions on the computing device 200. For example, the application 214 in memory 210 may be configured according to aspects of the present invention to process a digital image 100, including both reflow and non-reflow blocks, into a document that identifies non-reflow content for rendering.

The computing device 200 optionally includes an image store 216 and a content store 218. The image store 216 stores digital images for processing into reflow content. As the image store 216 is optional, the digital image 100 may be obtained from a scanner connected to the input device interface 206 or from an external source via the network interface 204. Once the digital image is processed, the converted digital content is stored in the content store 218. Similarly, the document store may be viewed as optional as the resultant digital content may be immediately sent to a display device via the display interface 208, streamed to a user's computer, or to an external location or resource for storage via the network interface 204.

Figure 3:
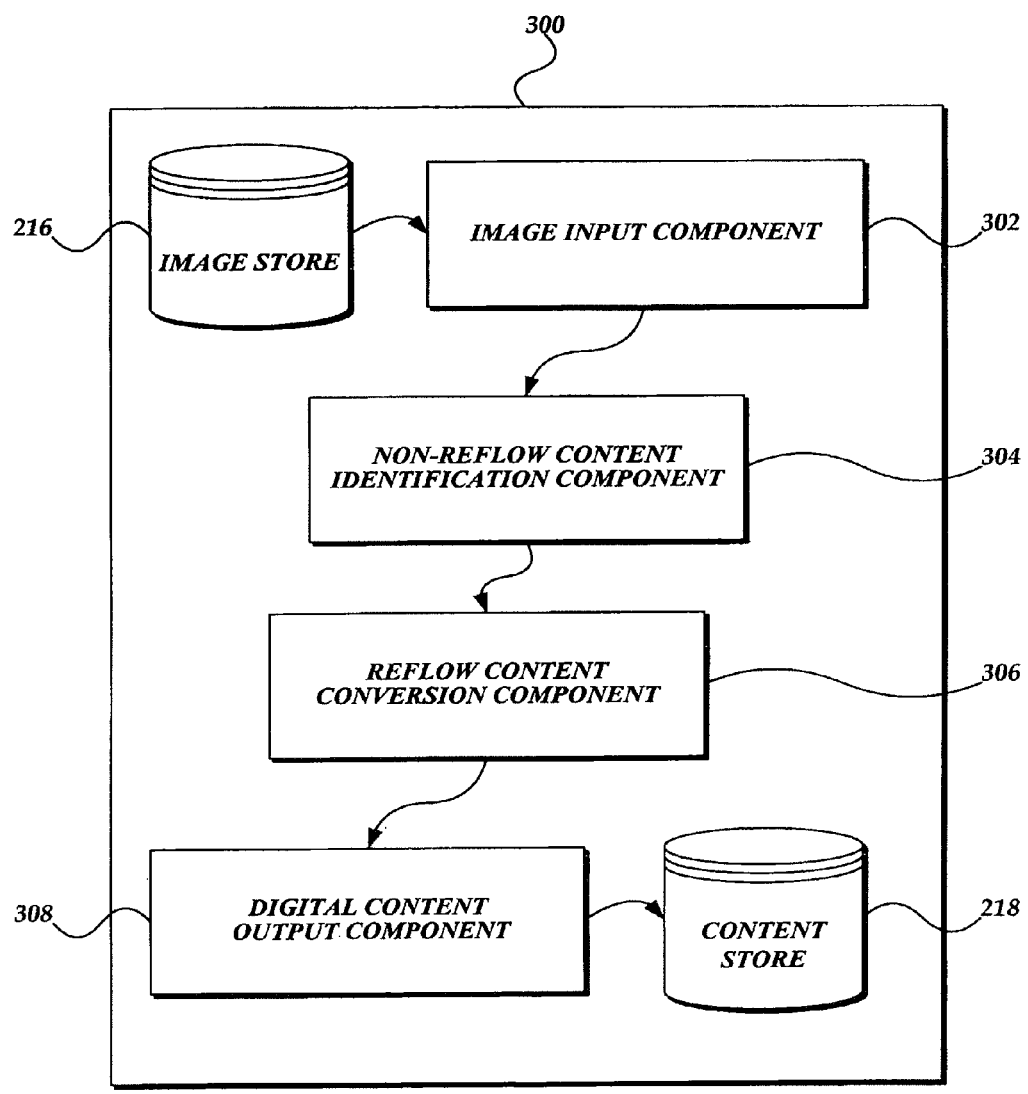
FIG. 3 is a block diagram illustrating logical components of an image processing system for processing a digital image including both reflow and non-reflow blocks of content into a reflow document, in accordance with aspects of the present invention.

A digital image processing system suitable for processing a digital image into a reflow-capable digital document may be implemented in a single application or module implemented on a computing device 200, in a plurality of cooperating applications/modules on a single computing device, or in a plurality of cooperating applications and/or modules distributed in a computer network. However, irrespective of the actual implementation and/or topography of the digital image processing system, the digital image processing system may be identified with regard to various logical components. To that end, FIG. 3 is a block diagram illustrating logical components of a digital image processing system 300 for processing a digital image 100, including both reflow and non-reflow blocks of content, into a document. Similarly, FIG. 4 is a flow diagram illustrating an exemplary routine 400 for processing a digital image 100 having both reflow and non-reflow blocks of content using the logical components of FIG. 3.

It should be noted that, however, with regard to the illustrated digital image processing system 300 (FIG. 3), the illustrated system 300 includes both the image store 216 and the content store 218. However, as discussed above, the inclusion of the image store 216 and the content store 218 is exemplary/optional, as the digital image processing system 300 may obtain a digital image 100 from local storage (e.g., the image store 216), a network source, or digital image generating device such as a scanner, a digital camera, and the like. Similarly, the digital image processing system 300 may output the resultant reflow-capable digital content to local storage (e.g., the content store 218), a network source, or stream it to a user immediately for display/consumption. Thus, while the subsequent description of the digital image processing system 300 and routine 400 is made with regard to both the image store 216 and the content store 218, it is for simplicity and clarity in description only and should not be construed as limiting upon the present invention.

Figure 4:
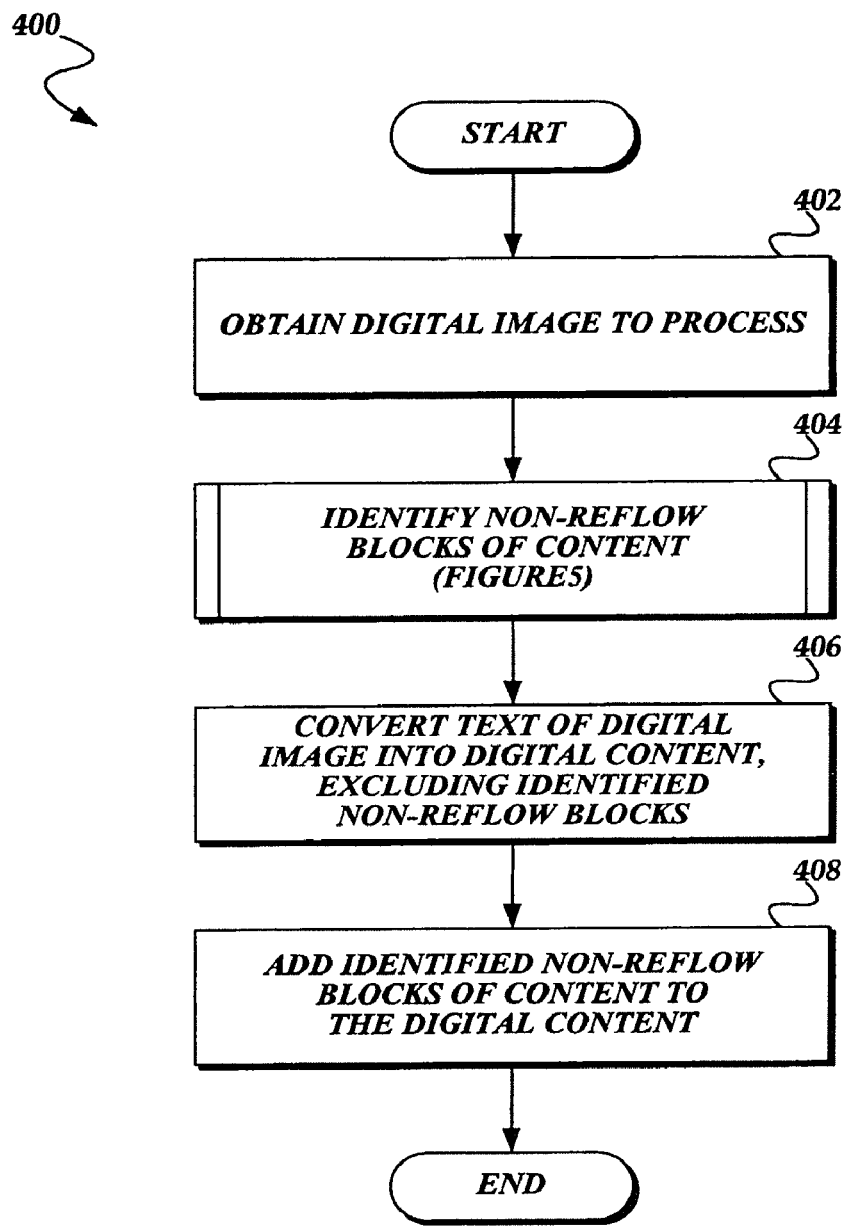
FIG. 4 is a flow diagram illustrating an exemplary routine for processing a digital image having both reflow and non-reflow blocks of content.

With regard to the exemplary routine 400 of FIG. 4, and with further reference to the digital image processing system 300 of FIG. 3, at block 402, the image input component 302 obtains a digital image 100 of content, including both reflow and non-reflow blocks of content. As shown in FIG. 3, in an illustrative embodiment, the image input component 302 obtains the digital image 100 from the image store 216.

At block 404, the digital image processing system 300, via the non-reflow content identification component 304, identifies one or more non-reflow blocks of content in the digital image 100. An illustrative routine for identifying types of non-reflow blocks of content is described in more detail below in regard to FIG. 5. As part of, or in addition to, identifying non-reflow blocks of content, the identified non-reflow blocks of content may be marked or information regarding them is recorded such that they (the non-reflow blocks of content) are not processed with the reflow blocks of content. Instead, the non-reflow blocks can be processed separately (including no processing at all.)

At block 406, the digital image processing system 300, via a reflow content conversion component 306, processes the reflow blocks of content in the digital image. Processing reflow blocks of content, in regard to processing content into glyphs, is described in the above-incorporated application "Method and System for Converting a Digital Image Containing Text to a Token-Based File for High-Resolution Rendering."

At block 408, the digital image processing system 300, via a digital content output component 308, outputs the processed digital content, including the processed reflow content and the identified non-reflow blocks of content, into a digital content file that is saved to the content store 218. In an illustrative embodiment, the non-reflow blocks of content are copied to the digital content file such that they may be displayed by the user at the user's discretion, strategically located in the document such that they do not corrupt the reflow content, or in some cases, not displayed at all. Headers and footers are examples of non-reflow blocks of content that may not be displayed at all. Additionally, certain information regarding the non-reflow blocks of content are typically included when the non-reflow blocks are copied to the digital content file. This information includes, for example, the bounds of the non-reflow block of content, its location in the digital image 100, a confidence rating (as will be discussed below), a type indicator identifying the type of non-reflow block of content (e.g., header, footer, caption, graph, etc.), and the like. After storing the resultant digital content file in the content store 218, the exemplary routine 400 terminates.

With regard to storing the non-reflow blocks of content into the digital content file, in one embodiment, not all non-reflow blocks of content are copied to the digital content file. In particular, some non-reflow blocks of content (such as headers and/or footers) are informative only, and do not include essential material as to the reflowable content. Thus, these, and other types of non-reflow blocks may, or may not be copied to the digital content file, and if copied to the digital content file, may be suppressed with regard to being subsequently displayed in a viewer.

In regard to storing the resultant digital content, it should be appreciated that the resultant content may be directed to volatile or non-volatile memory, directed to a local or remote data stream, or, as indicated above, written to a file. Accordingly, while the present discussion is made with regard to a digital content file that may be stored in a content store 218, it is for illustration purposes only, and should not be construed as limiting upon the present invention.

With regard to the non-reflow blocks of content, the non-reflow blocks of content may include some textual content that could be converted into reflow content. Indeed, many types of non-reflow blocks of content include textual content that may benefit from conversion to reflow content. For example, with regard to FIG. 1, footnote 114 is comprised entirely of textual content that, when displayed to a user on a computer, may be benefited by conversion to reflow content. Accordingly, while not shown in FIG. 4, in addition to outputting any identified non-reflow blocks of content into the reflow document as static images, content with identified non-reflow blocks of content may be individually processed into reflow content and the reflow content of the non-reflow blocks of content saved to the resultant digital content file.

Figure 5:
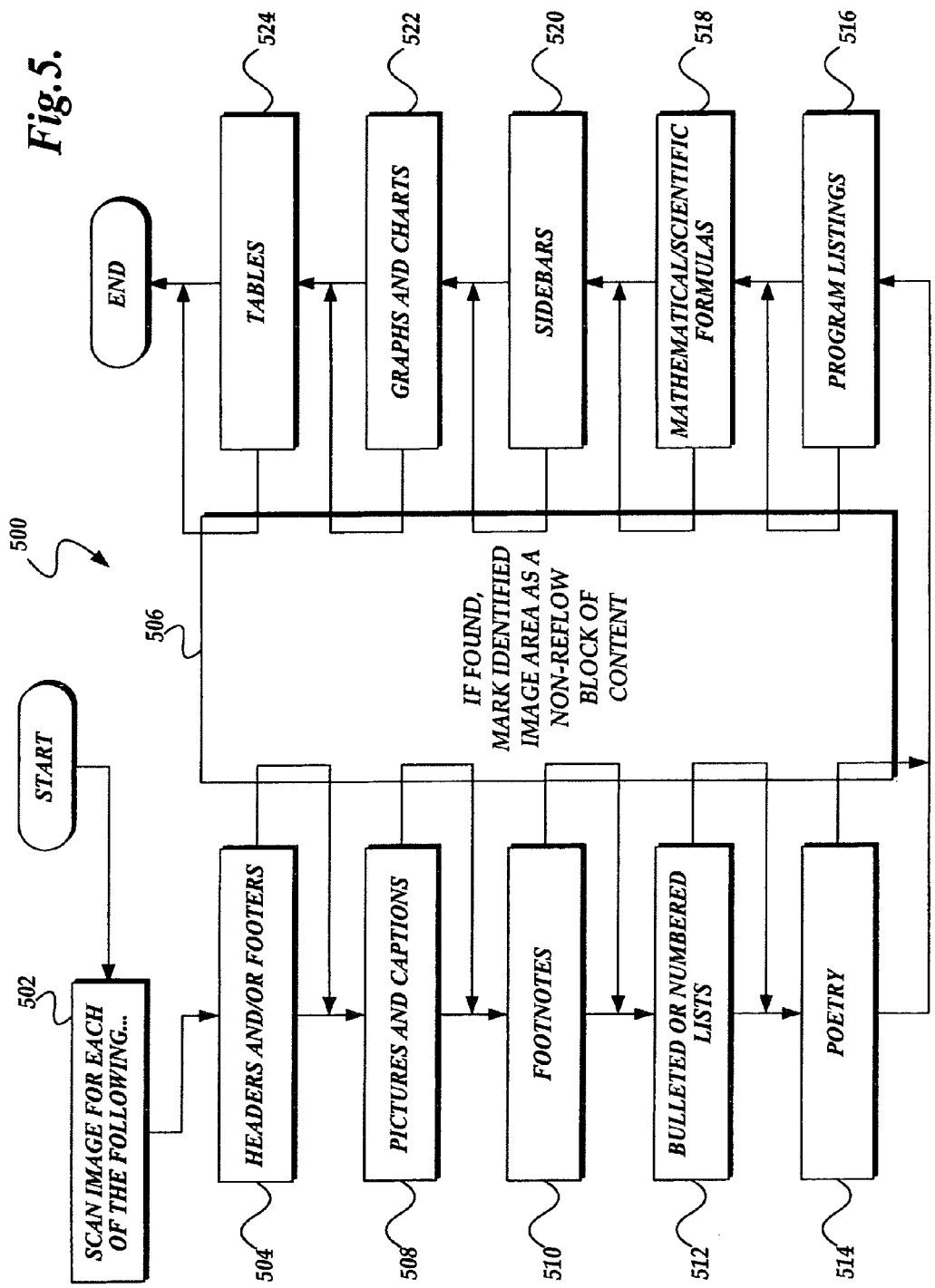
FIG. 5 is a flow diagram illustrating an exemplary routine for identifying non-reflow blocks of content in a digital image.

With regard to identifying non-reflow blocks of content in a digital image, FIG. 5 is a flow diagram illustrating an exemplary routine 500 for identifying non-reflow blocks of content in a digital image 100. Beginning at block 502, the exemplary routine begins scanning the digital image 100 for non-reflow blocks of content, as described below.

At block 504, the non-reflow content component 304 scans the digital image 100 for a header and/or footer. As those skilled in the art will readily appreciate, a large portion of printed content, especially books and magazines, will contain one or more headers and/or footers. For example, with regard to FIG. 1, digital image 100 includes header 106.

Figure 6:
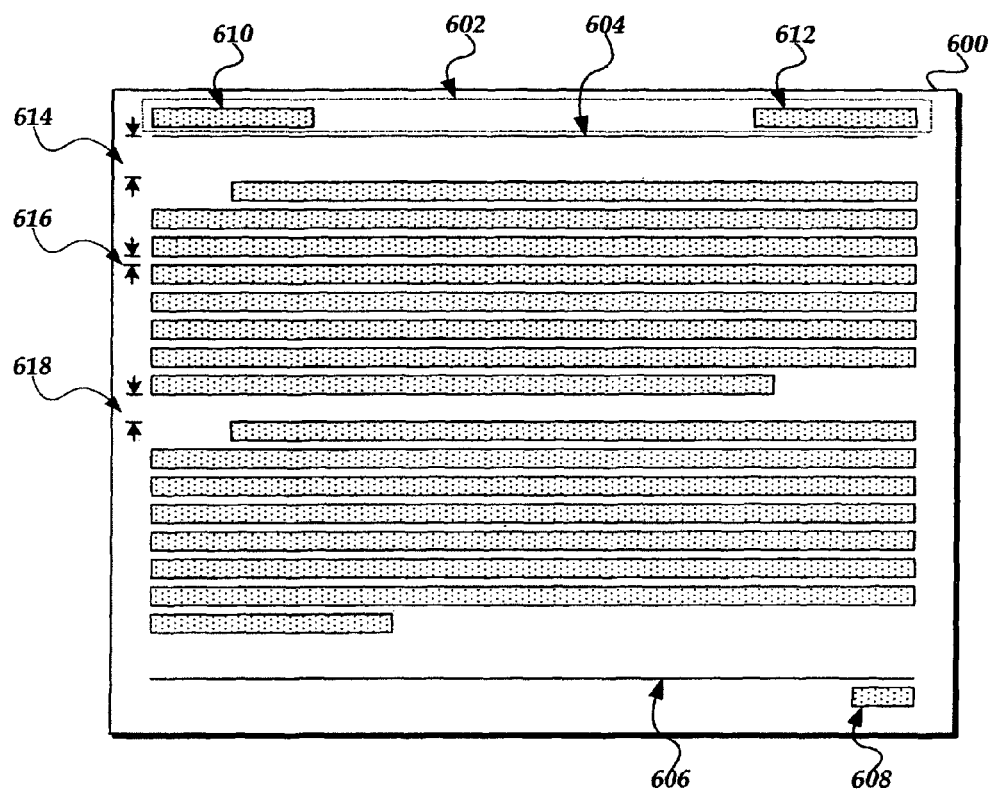
FIG. 6 is a pictorial diagram illustrating an exemplary page pattern corresponding to a printed page of content.

In an illustrative embodiment, identifying a header and/or footer in a digital image 100 can rely upon locating patterns characteristic of a header or footer. FIG. 6 is a pictorial diagram illustrating an exemplary page pattern 600 corresponding to a printed page of content. As is easily recognized as a "typical" page of content, the page pattern 600 includes a header area 602, two paragraphs for text, a footer 608, and separator lines 604 and 606. With regard to recognizing headers and footers in a page pattern in the exemplary routine 500, various criteria and/or identifying characteristics may be used. For example, though headers and footers may be multi-lined, headers and footers are, by their nature, found at the very top and very bottom of pages, respectively, i.e., the first and last items on a printed page. Headers and footers are frequently, but not always, set apart from the main body of the page content by a separator line, such as separator lines 604 or 610. However, whether or not there is a separator line, headers and footers are also typically separated from the main body of the page content by white space, as shown by 614, of an amount greater than the line spacing in paragraphs, as shown by 616, or between paragraphs, as shown by 618.

Headers and footers can also include the same or similar content over several pages of content, or over alternating pages of content. For example, page numbering, while frequently increasing with each page, will have some content remain constant (such as the tens or hundreds values) over several pages and appear at the same location, or at alternating locations, on the pages or alternating pages. Finding repeating lines (over several or alternative pages) with a sequence of numbers, numerals, or letters (either increasing or decreasing), is frequently viewed as indicative of page numbering, and may be used to identify a line or lines of text in a header or footer. Titles, chapter names, section names, and the like are also examples of the similar text that appears in headers and footers.

With regard to page numbering, those skilled in the art will appreciate that in some contexts, page numbers actually decrease, rather than increase. For example, in some books, the preface and/or foreword portions of the book are arranged in descending order up to the book's "first" page. Additionally, increasing and decreasing values may be displayed in roman numerals, alphanumeric, or numeric values. Moreover, when page numbering is encountered, the confidence rating that the particular block of content is a header or footer may be elevated/increased.

Headers and footers can also incorporate alignment features that are not found in typical paragraphs. For example, header 602 includes two parts, 610 and 612. Part 610 is left aligned with the left-most margin on the page 600, whereas part 612 is right aligned with the right-most margin on the page 600. This particular alignment for a header is also shown in header 106 of FIG. 1. This type of alignment, as well as others (such as a centered title with page numbering on an outside margin), illustrates that headers and/or footers are frequently identifiable by substantial gaps of white space between text in a header and/or footer. Also illustrated in FIG. 1, though not shown in FIG. 6, headers and/or footers may not be aligned with the margins of the general body of content. More particularly, header 106 is farther to the left of the digital image 100 than paragraphs 102 and 104, which represent the general body of content for this image.

Another "pattern" that may be used with regard to recognizing headers and/or footers is by analyzing the number of characters that is found on the lines of content with regard to the mean number of characters per line over several pages of text. Headers and, especially, footers frequently include substantially fewer characters in their lines than the average line of text.

By analyzing one or more combinations of the above-described criteria, as well as other criteria that distinguish headers and footers from other portions of page content, the non-reflow content component 304 identifies headers and/or footers in a digital image 100. Moreover, in general, each non-reflow block of content may be identifiable via one or more aspects. Accordingly, in identifying each type of non-reflow block, the identification may be based on one or more of a plurality of identifying characteristics/aspects.

Returning again to FIG. 5, if the non-reflow content component 304 identifies a header and/or footer in the digital image 100, the routine proceeds to block 506. At block 506, the non-reflow content component 304 marks the identified image area as a non-reflow block of content such that the reflow content conversion component 306 can bypass this non-reflow block during the conversion of the reflow content.

With regard to "marking" the non-reflow block of content, it is not necessary and the present usage of the term "mark" should not necessarily be literally construed as modifying the digital image 100 with marking information. Instead, "marking" should be interpreted as saving, at least temporarily, information that specifies the boundaries of the identified non-reflow block, including both the dimensions of the identified non-reflow block as well as its location in the particular digital image 100. Thus, marking information may be placed in a data structure, or series of data structures, that identifies a non-reflow block of content. This "marking" information is made available to the reflow content conversion component 306 such that identified non-reflow blocks of content may be excluded from processing the general body of the content. According to embodiments of the present invention, this marking information as well as other information, such as confidence information (that will be discussed below) and non-reflow block type, is typically also copied with the non-reflow block of content into a reflowable digital content file.

If a header or footer was not identified in the digital image 100, or after marking the identified header and/or footer for exclusion in processing the reflow content, the routine 500 proceeds to block 508. At block 508, the non-reflow content component 304 scans the digital image for pictures and/or associated captions, such as picture 110 and caption 108 in FIG. 1. As above, if a picture and/or caption is identified, at block 506 the non-reflow content component 304 marks the identified block or blocks as non-reflow and subsequently continues in identifying and marking additional non-reflow blocks of content.

With regard to identifying pictures and associated captions in a digital image, those skilled in the art will appreciate that there are existing techniques for identifying pictures/graphics within a digital image 100, any one of which may be employed in identifying a picture. While graphic 110 (FIG. 1) is shown without an encompassing border, graphics frequently reside within an encompassing border or frame.

Figure 1:
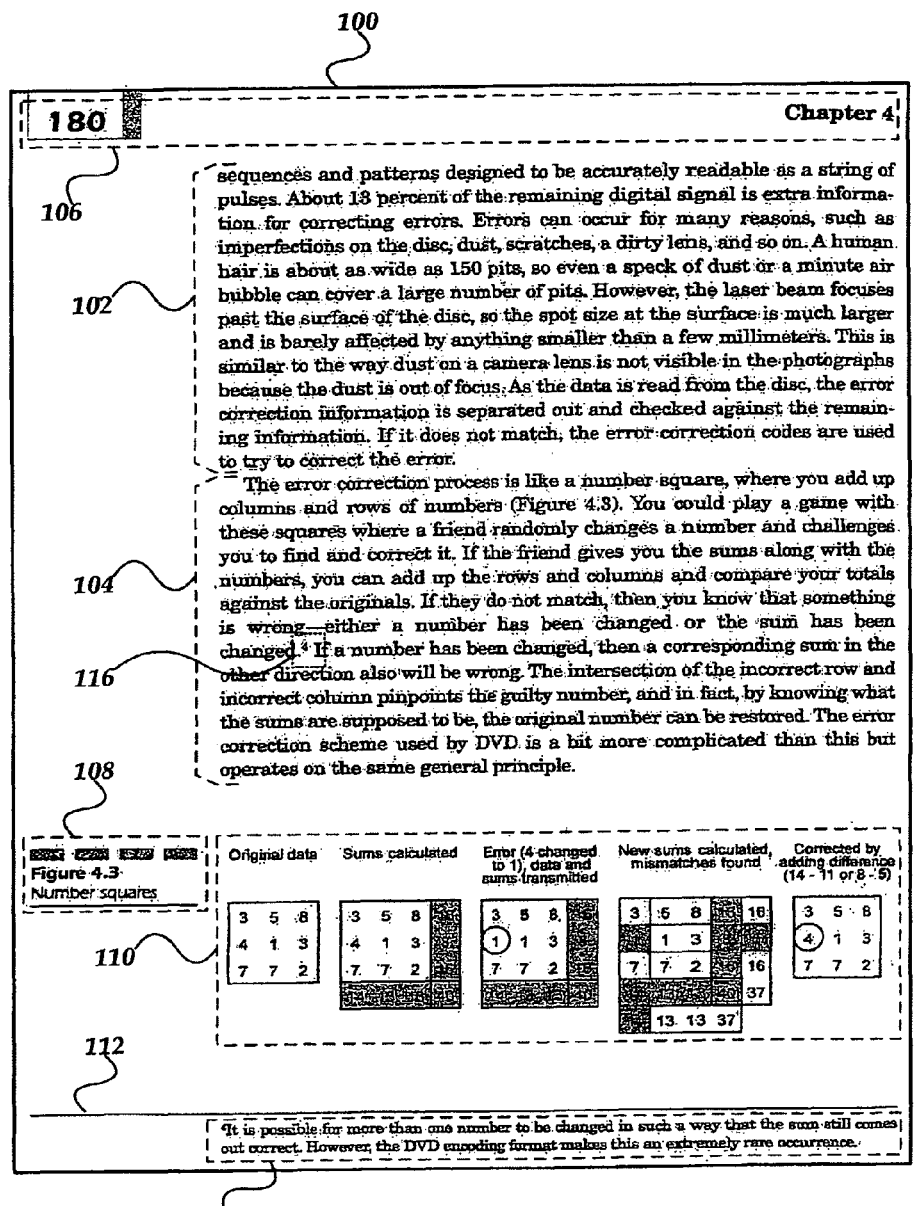
FIG. 1 is a pictorial diagram illustrating a digital image of a printed page of content including both reflow and non-reflow blocks of content.

Captions, such as caption 108 of FIG. 1, include some textual content that describes a picture and is placed in proximate location to the corresponding picture. Captions can be identified as they are usually separated by white space from the regular body of reflow content, such as caption 110 falling outside of the alignment of paragraphs 102 and 104. Moreover, captions are typically located in close proximity to, on, or within the boundaries of the corresponding picture.

With regard to captions, while the present discussion is made solely with regard to pictures in a digital image 100, it is for illustration and clarity purposes only. Captions are frequently associated with other types of non-reflow content, including tables, graphs, charts, mathematical and/or scientific formulas, program listings, lists, etc. Accordingly, while captions are only described herein with regard to pictures, the present invention should not be construed as limiting the identification of captions solely with corresponding pictures.

Returning again to FIG. 5, at block 510, the non-reflow content component 304 scans the digital image 100 for footnotes, such as footnote 114 in FIG. 1. If a footnote is found, at block 506 the non-reflow content component 304 marks the identified footnote as a non-reflow block and continues identifying and processing additional non-reflow blocks of content.

There are various characteristics that can be used to identify a footnote in a digital image 100. Footnotes are located at or near the bottom of a page; lower than other text except, perhaps, footers. Frequently, but not always, footnotes are separated from the main body of the content by a separator line. Additionally, footnotes are typically commenced with a footnote number and, moreover, the footnote number is frequently displayed as a superscript to the body of the footnote. Still further, footnotes, as with headers and/or footers, are also typically separated by white space greater than is typically found in the general body of content. Many of these indicia are found with regard to footnote 114. For example, digital image 100 includes a footnote 114 that is commenced with the footnote number "4" in superscript; footnote 114 is separated from other content in the image via separator line 112; and footnote 114 is separated from the main body of content with a substantial amount of white space.

At block 512, the non-reflow content component 304 scans the digital image 100 for bulleted and/or numbered lists. If a bulleted and/or numbered list is found, at block 506 the non-reflow content component 304 marks the identified list as a non-reflow block of content and returns to continue identifying and processing other non-reflow blocks of content.

Bulleted or numbered lists are considered non-reflow blocks of content in order to preserve the separation between list items. This, of course, does not mean that the textual content in the individual elements could not be reflowable (such as indicated above with regard to processing the content of non-reflow blocks), but simply that the itemization of the list elements should be maintained. Bulleted lists are typically indented from the left (and sometimes right) margin of the main body of content. After indentation, a bulleted list item will include an initial symbol or "bullet", such as "•," "■," or "♦." Following the bullet is more indentation to the text of the list item. The following elements illustrate a bulleted list:

This bulleted list item is indented from the left margin of the main content.

This bulleted list item begins with the common symbol indicative of a bulleted list item such as "•."

This bulleted list item is aligned with other list items.

Numbered lists share many of the characteristics of a bulleted list, including indentation and alignment. However, rather than initial symbols, numbered lists begin with incrementing numbers (or letters). The following illustrates an exemplary numbered list:

1. This numbered item is indented from the left margin of the main content.
2. This numbered item is aligned with other numbered items.
3. This and other numbered items illustrate the incrementing leading numbers.

At block 514, the non-reflow content component 304 scans the digital image 100 for poetry. If poetry is found, at block 506 the non-reflow content component 304 marks the identified area as a non-reflow block of content and returns to continue identifying and processing other non-reflow blocks of content.

Poetry, perhaps more than bulleted or numbered lists, relies upon the arrangement of the text to convey the intent of the author. Thus, any reflowing, especially with regard to the general body of content, could potentially destroy the meaning and/or meter of the prose. Poetry is probably most characterized by short lines of text grouped together. The text may be indented similarly, though in some cases it is not.

At block 516, the non-reflow content component 304 scans the digital image 100 for program listings. If a program listing is found, at block 506 the non-reflow content component 304 marks the identified area as a non-reflow block and returns to continue identifying and processing additional non-reflow content.

Program listings are typically characterized by a series of statements (discrete logical instructions of a program or routine). Frequently, a statement is found on a single line, though this is not necessary. Similarly, statements may be very long with regard to the typical width of a page. Statements in program listings usually include various levels of indentation to illustrate process control, hierarchy, and/or nesting of statements. In printed content, program listings are typically found in a different typeface than the main body of content.

Program listings also frequently include and are, therefore, recognizable by reserved keywords and symbols. While those familiar with program listings will appreciate that keywords and symbols vary somewhat between programming languages, exemplary keywords that are frequently found in program listings include, but are not limited to: "for," "if," "then," "while," "goto," "return," etc. Similarly, exemplary symbols of program listings include, but are not limited to: "{ } [ ] ( ) % + − * / < > =". Some of these symbols, particularly "{ } [ ] ( )", are found in corresponding pairs, i.e., the "(" will pair with ")" and so on.

At block 518, the non-reflow content component 304 scans the digital image 100 for mathematical and/or scientific formulas. If a mathematical and/or scientific formula is found, at block 506 the non-reflow content component 304 marks the identified area as a non-reflow block of content and returns to continue identifying and processing additional non-reflow blocks of content.

Figure 7A:
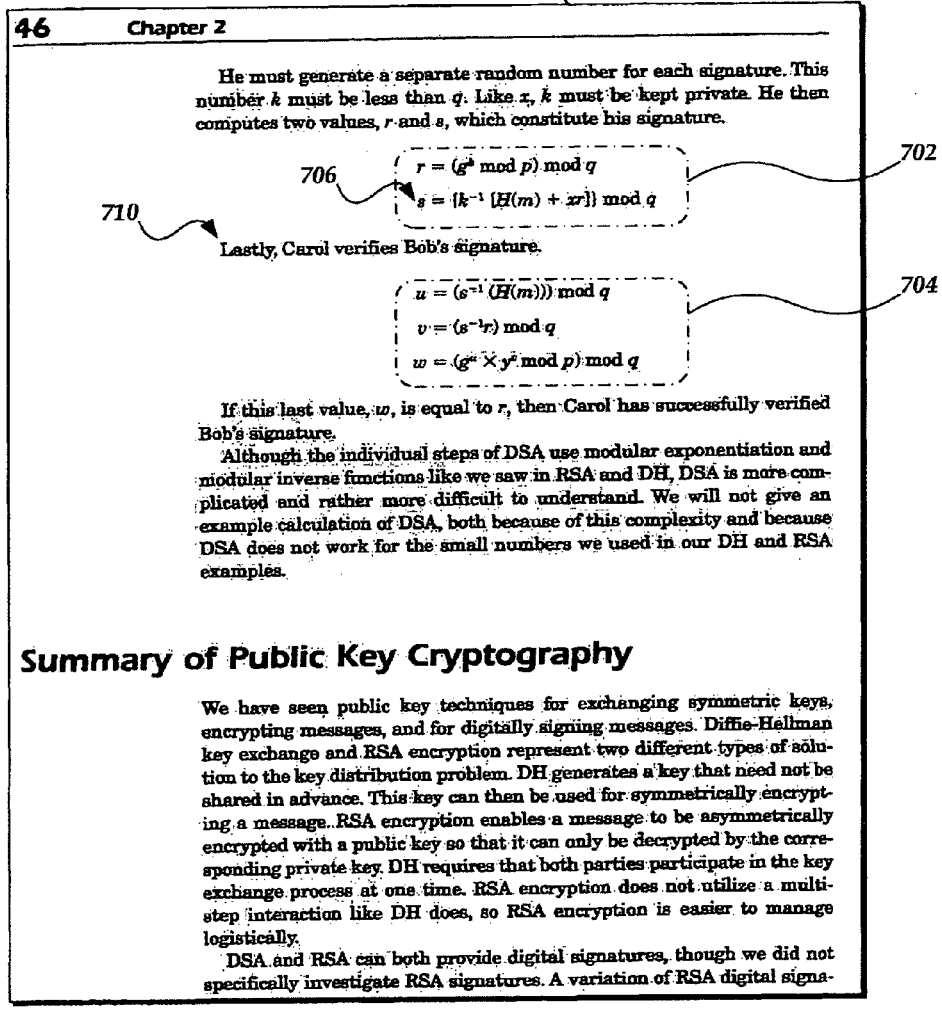
FIGS. 7A-7C are pictorial diagrams illustrating a digital image including a mathematical formula.

Mathematical and scientific formulas are similar to program listings in that they may be recognized through special symbols and/or keywords. More particularly, except for language specific syntax, statements in a program listing may be viewed as simply mathematical formulas. For example, FIG. 7A illustrates a digital image 700 of content including several mathematical formulas, as found in boxes 602 and 604. As can be seen, formula 606 in box 602 includes several mathematical symbols mentioned above in regard to program listings, including the following: "{ } ( ) + * − =." Greek letters, such as "π" and "θ," are often keys in identifying mathematical and/or scientific formulas. Keywords also denote mathematical and/or scientific formulas, such as "mod," "cos," "sin," "log," etc.

Figure 7B:
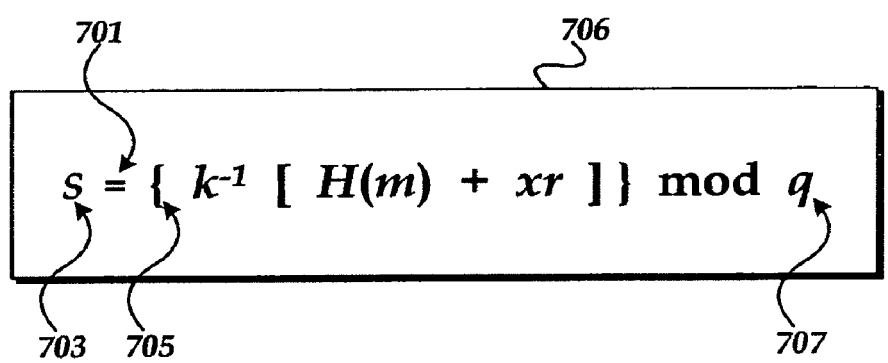

In regard to recognizing a mathematical or scientific formula, according to one embodiment, once a symbol or keyword associated with a mathematical or scientific formula is found or identified, the surrounding region of that symbol/keyword is examined for other symbols that may be viewed as part of a mathematical formula. For example, FIG. 7B illustrates the mathematical equation of formula 606. Assuming that token 701 ("=") was recognized as a likely candidate for a mathematical formula, surrounding regions are examined for other symbols that potentially may be part of the formula. In this, token 703 ("s"), while not necessarily a mathematical symbol by itself, may be part of a mathematical formula, as in the present case, and the boundary that defines the mathematical formula 606 is expanded to include it as well. Similarly, token 705 ("{") may be recognized as a potential mathematical symbol and is included in the mathematical formula's boundary, or rather, that the mathematical formula's boundary is expanded to include token 705. Scanning surrounding regions continues until some indicator is found that signifies the end of the mathematical (or scientific) formula. These indicia may include, but are not limited to, the edge of the digital image 700, the boundary of a previously identified non-reflow block of content (such as a picture or caption), a threshold amount of white space, and the like. Moreover, in addition to scanning to the left and right of an identified token or keyword, the content above and below should also be scanned for possible inclusion in the mathematical formula's boundary. In this manner, both mathematical formulas illustrated in box 702 could be grouped together in a single non-reflow block of content (as a mathematical formula) for subsequent copying to the resultant digital content file.

According to further embodiments of the present invention, after processing the surrounding region in an effort to be inclusive with regard to the identified mathematical formula, the non-reflow content component 304 may then examine the included content to determine whether content should not have been included in the non-reflow mathematical formula. For example, and with regard again to FIG. 7A, assuming that in attempting to be inclusive the non-reflow content component 304 initially included line 710 to the mathematical formula, a subsequent evaluation process may determine that the inclusion of line 710 was overly aggressive and remove it from the mathematical formula, i.e., change the mathematical formula's boundaries to exclude line 710.

Figure 7C:
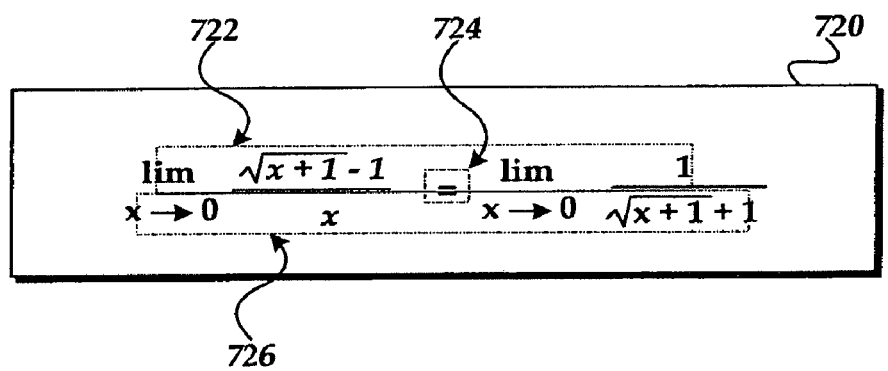

In addition to recognizable mathematical keywords and symbols, mathematical formulas often include a particular spatial arrangement that sets them apart from the general body of reflow content. More particularly, mathematical formulas frequently have multiple lines of "content" that are closely located to each other—even overlapping, and do not follow the normal flow of content and spacing as regular reflow content. To illustrate, FIG. 7C is a pictorial diagram illustrating an exemplary mathematical formula 720 useful for illustrating spatial arrangement aspects of a mathematical formula 720. As shown in FIG. 7C, formula 720 includes various "lines" of textual content as illustrated by boxes 722-726. As can be seen, boxes 722 and 724 abut each other, while box 726 overlaps both boxes 722 and 724. Clearly, the content in this mathematical formula 720 is arranged in a manner inconsistent with and distinguishes it from typical reflow content, as shown in FIG. 6.

With reference again to FIG. 5, at block 520, the non-reflow content component 304 scans the digital image 100 for sidebars. If a sidebar is found, at block 506 the non-reflow content component 304 marks the identified area as a non-reflow block and returns to continue identifying and processing additional non-reflow blocks of content.

A sidebar is typified by textual content that is somewhat related to the subject matter of the reflow content, like a parenthetical statement to the regular content. However, simply including the sidebar's content within the regular body of reflow content would corrupt the content. Sidebars, as text, are distinguishable from the reflow content through various aspects. For example, sidebars are frequently embedded in a bounding box, or lie outside of the normal, reflow content. FIG. 8 is a pictorial diagram illustrating an exemplary digital image 800 including a sidebar 802. As can be seen, sidebar 802 is defined by a bounding box. Additionally, there is substantial white space between the regular, reflow content and the sidebar. Quite frequently, sidebars include a background color (not shown) and/or are presented in a different typeface or emphasis (such as bolded). While not shown in FIG. 8, sidebars, just as pictures, formulas, etc., may be associated with a caption.

With reference again to FIG. 5, at block 522, the non-reflow content component 304 scans the digital image 100 for graphs and/or charts. If a graph and/or chart is found, at block 506 the non-reflow content component 304 marks the identified area as a non-reflow block and returns to continue identifying and processing additional non-reflow content.

Figure 9:
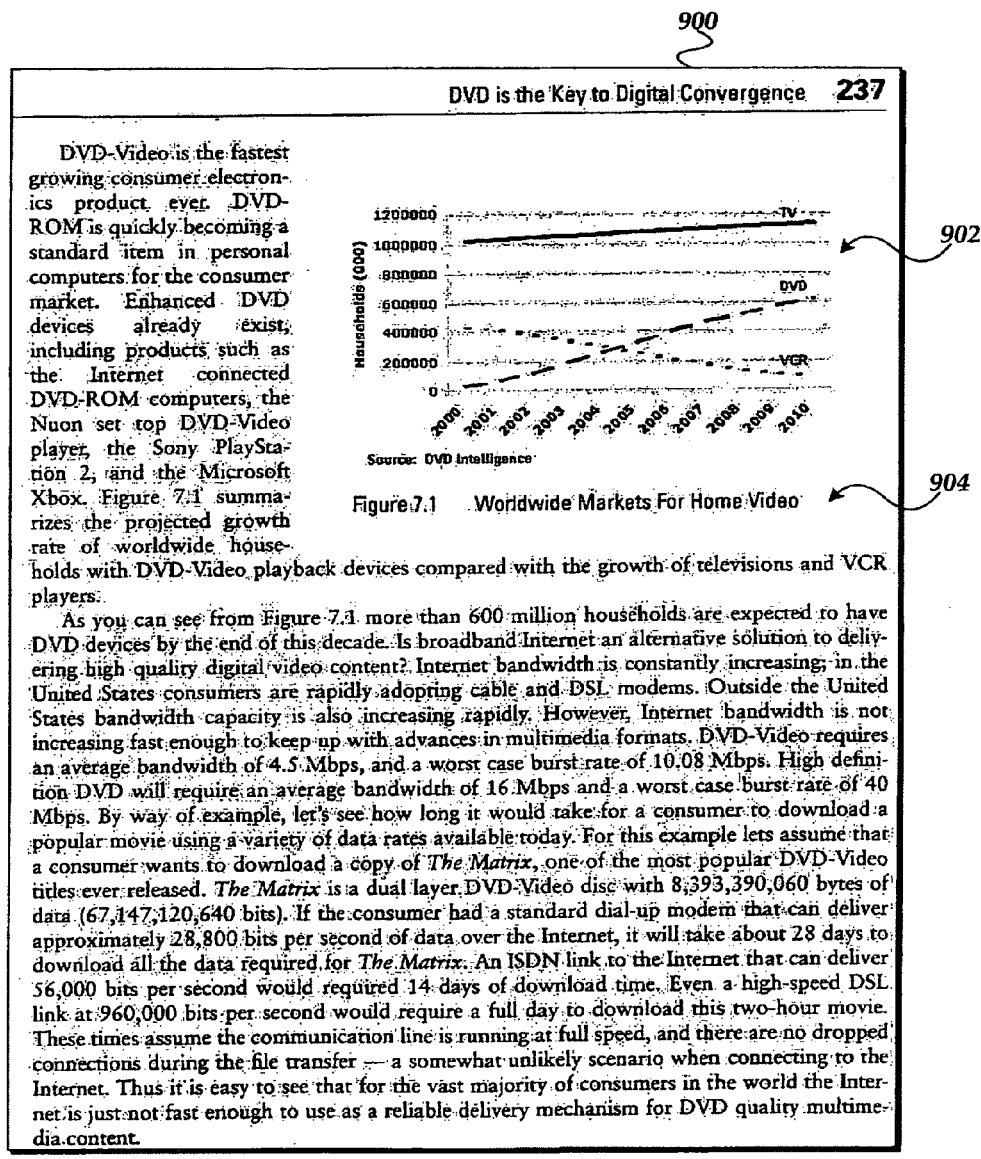
FIG. 9 is a pictorial diagram illustrating a digital image including a chart and caption.

FIG. 9 is a pictorial diagram illustrating an exemplary digital image 900 including a chart 902. Graphs and/or charts typically include a combination of graphics and text, and are recognizable as such. However, the text within a graph or chart, such as chart 902, only really makes sense in regard to the arrangement of the graph/chart. Thus, the spatial relationship should be maintained.

Graphs and charts are typically set apart from the regular content with substantial white space. Graphs and charts are typically positioned such that the regular text can flow or wrap around the graph/chart. Like sidebars and pictures, graphs and charts are frequently encompassed with a bounding frame, although chart 902 does not have a frame. Graphs and charts are also frequently associated with captions, such as caption 904.

At block 524, the non-reflow content component 304 scans the digital image 100 for tables. If a table is found, at block 506 the non-reflow content component 304 marks the identified area as a non-reflow block and returns.

As those skilled in the art will recognize, tables typically include a bounding frame or border with generally uniform rows and columns of cells. More particularly, while some cells may be joined to others to create larger cells in place of one or more single cells, the cells in a table will still conform to the general row/column structure of the table. Cells frequently include textual content. However, the row and column structure of a table provides context and meaning to the information in table cells such that freely reflowing cell content would cause it to lose meaning. Thus, the spatial arrangement of a table should be maintained.

With regard to FIG. 5, after processing the digital image 100 for the various types of non-reflow content, the exemplary routine 500 terminates. It should be noted, however, that while the exemplary routine 500 illustrates a particular order in processing non-reflow blocks of content, this ordering is illustrative only and should not be construed as limiting upon the present invention. Moreover still, while the above described steps illustrated of routine 500 are separate and sequential, this is for illustration only. In an actual embodiment, any number of these steps may be implemented to run in parallel and or in combination with other steps.

Figure 10:
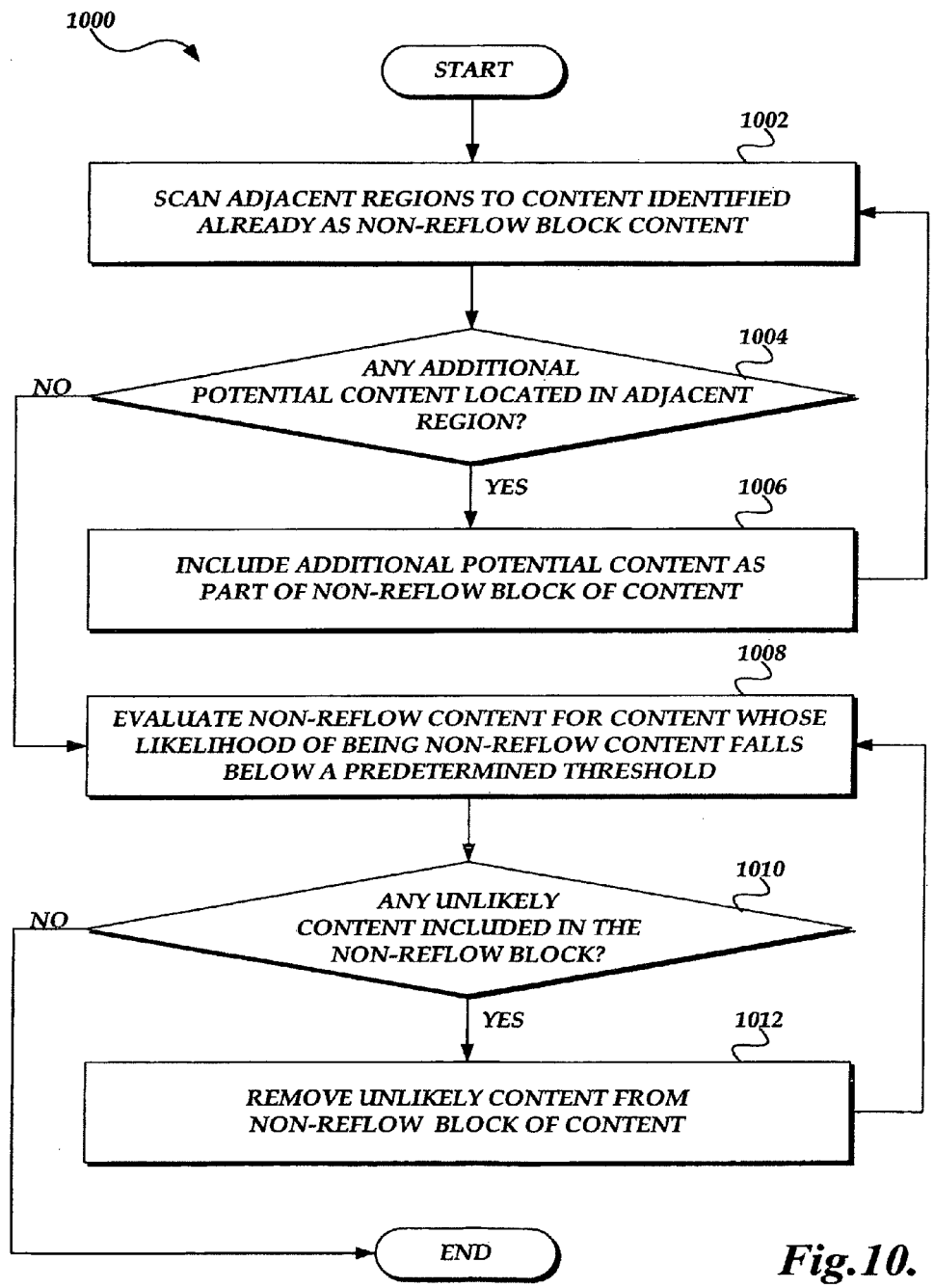
FIG. 10 is a flow diagram illustrating an exemplary routine suitable for determining the bounds of a non-reflow block of content.

With regard to identifying the bounds of a mathematical or scientific formula as described above, particularly being initially aggressive in including potential content and subsequently evaluating the content for over-inclusiveness, it should be appreciated that this practice may be applied generally to all types of non-reflow blocks of content. To that end, FIG. 10 is a flow diagram illustrating an exemplary routine 1000 suitable for determining the bounds of a non-reflow block of content.

The routine 1000 is initiated by locating some content that is identified as being part of a non-reflow block of content. Thus, at block 1002, the adjacent regions surrounding the content identified as being part of a non-reflow block of content are examined. At decision block 1004, a determination is made as to whether any additional potential content (as in potential content for inclusion in the non-reflow block of content) is located in the adjacent regions. If additional potential content is found, at block 1006 the exemplary routine includes the additional potential content as part of the non-reflow block of content. As indicated above, this is likely to be done by expanding the borders of the non-reflow block of content to include the additional potential content from the surrounding region. Thereafter (and with the boundaries of the non-reflow block expanded), the routine 1000 returns again to block 1002.

Once no additional potential content is identified for inclusion in the non-reflow block of content, the routine 1000 proceeds to block 1008. At block 1008, the non-reflow block of content is evaluated for content whose likelihood for inclusion as non-reflow content falls below a predetermined threshold. The likelihood determination is typically based on heuristics adapted according to the particular type of non-reflow block of content. At decision block 1010, a determination is made as to whether any unlikely content (falling below the predetermined threshold) has been mistakenly included in the non-reflow block of content. If so, the routine proceeds to block 1012 where the unlikely content is removed from within the bounds of the non-reflow block of content. Thereafter, the routine 1000 returns again to block 1008 for a re-evaluation as described above. Once all content whose likelihood of inclusion falls below a predetermined threshold has been eliminated, the routine 1000 terminates.

Clearly, part of the problem with determining whether or not certain content is non-reflow content via automated procedure is that, sometimes, it is simply a close call, e.g., it is not always possible to heuristically determine, with a high degree of confidence, whether or not some content is non-reflow content. Compounding this lack of confidence is the desire or need to convert a digital image 100 to reflow content with near 100% accuracy. Thus, according to aspects of the present invention, because not all non-reflow blocks are identified with a high degree of confidence or certainty, the non-reflow content identification component 304 makes a heuristic determination as to its confidence in identifying a non-reflow block of content and stores this confidence rating with the non-reflow block in the digital content file. The heuristic determination of the confidence rating may be different for each type of non-reflow block of content (e.g., header, footer, sidebar, list, poetry, etc.) Storing the confidence rating associated with an identified non-reflow block enables further aspects of the present invention, namely a process by which digital image conversions may be efficiently processed in automated procedures, and corrected manually when and where a confidence rating falls beneath a predetermined threshold.

Figure 11:
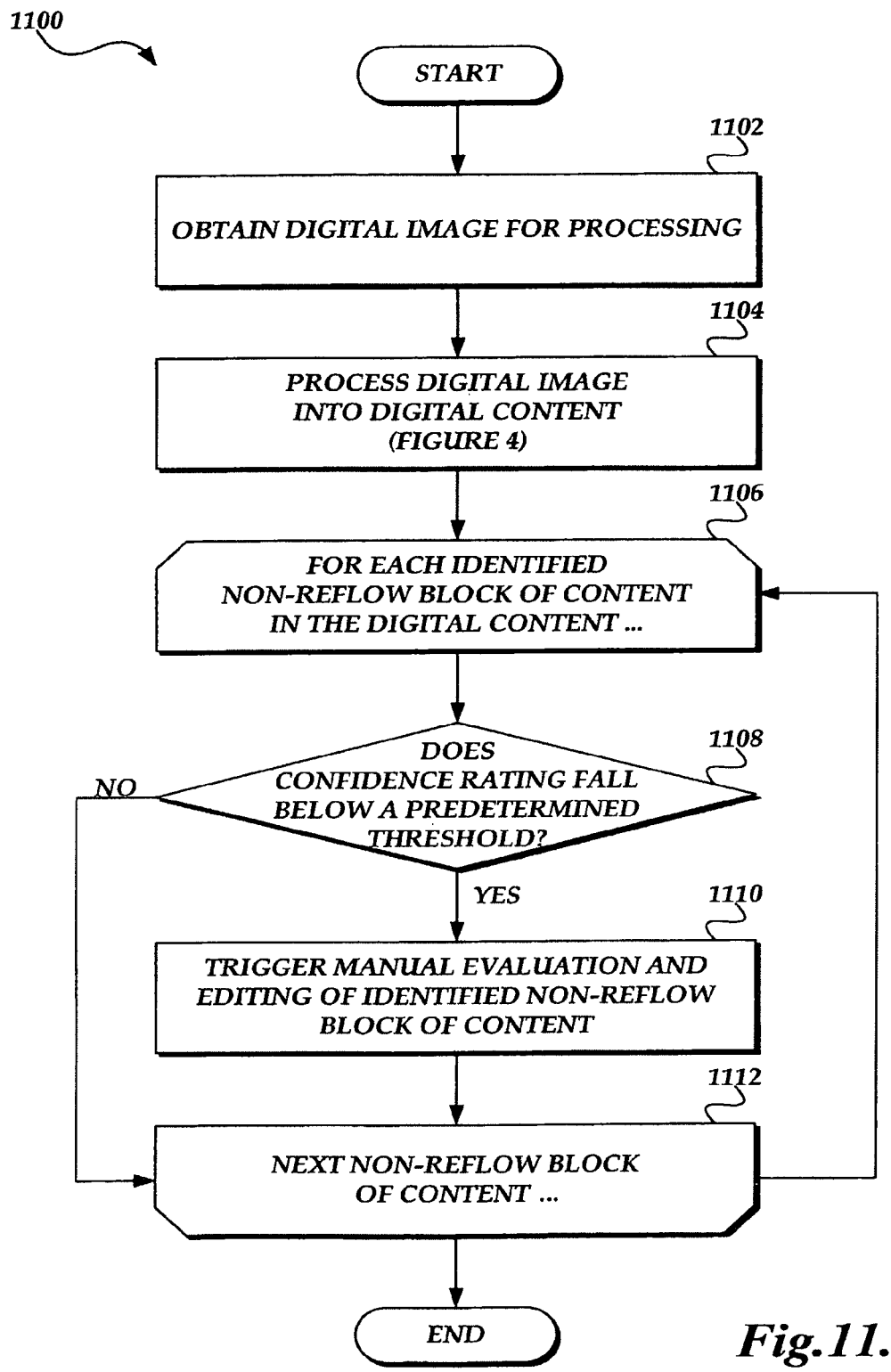
FIG. 11 is a flow diagram illustrating an exemplary routine for processing a digital image using an automated process and triggering manual evaluation and editing when the confidence of the automated conversion is below a predetermined threshold.

FIG. 11 is a flow diagram illustrating an exemplary routine 1100 for processing a digital image using an automated process and triggering manual evaluation and editing when the confidence of the automated conversion is below a predetermined threshold. Beginning at block 1102, a digital image 100 is obtained for automated processing into reflow content. At block 1104, the digital image 100 is processed into digital content including reflow and non-reflow content. In accordance with aspects described above, the non-reflow content, or identified non-reflow blocks of content copied to the digital content, include, but are not limited to, information regarding the boundaries of the block, the location in the digital image where it was located, where in the reflow content it would fall, the type of non-reflow block, and a confidence rating indicating the level of confidence the non-reflow content conversion component 304 assigned to the non-reflow block of content.

At control block 1106, a looping process is begun to iterate through each identified non-reflow block of content in the digital content obtained in block 1104. More particularly, for each identified non-reflow block of content the following steps are executed. At decision block 1108, a determination is made as to whether the confidence rating assigned to the current non-reflow block of content falls below a predetermined threshold. For example, a content provider may wish to evaluate all identified non-reflow blocks of content that fall below a 75% confidence rating to ensure a high degree of accuracy. Other thresholds, both higher and lower, may be used according to content provider preferences.

According to one aspect of the present invention, a plurality of predetermined thresholds may be used, such that for each type of non-reflow block of content there is a corresponding predetermined threshold (which may be different than other predetermined thresholds). For example, a predetermined threshold for a header may be "90" (set relatively high because headers will not be displayed in the resultant document), while a predetermined threshold corresponding to captions may be "75." In this manner, the overall conversion process can be specifically tailored to a content provider's needs. Thus, while in some embodiments, a determination to whether the confidence rating assigned to the current non-reflow block of content falls below a default predetermined threshold applicable to all types of non-reflow blocks of content, in other embodiments, the determination is made with regard to non-reflow type-specific predetermined thresholds.

If the confidence rating assigned to the current non-reflow block of content falls below the predetermined threshold, the routine 1100 proceeds to block 1110. At block 1110, the exemplary routine triggers a manual evaluation and editing process of the current non-reflow block of content. The evaluation and editing process will typically present the digital image 100, the identified non-reflow block of content and its type, and will also include tools necessary for a person to make any corrections with regard to the evaluated non-reflow block of content. Of course, the triggered evaluation and editing process may occur at the time that the low confidence rating was detected, or queued for asynchronous processing at a later time.

In regard to the manual evaluation and editing process, according to one embodiment, the confidence rating is also presented to the person conducting the manual evaluation. This confidence rating may be presented as a value, or alternatively as a color and/or intensity of color. More generally, the confidence rating may be denoted through a particular font, font size, color (e.g., hue, saturation, intensity), brightness, progression or motion, or other parameter. Symbols or numbers may be also be shown to denote the confidence rating. In one embodiment, the intensity of the color displayed to a person when presenting the non-reflow block for manual evaluation and editing directly relates to the difference between confidence rating and the predetermined threshold. Moreover, the color used may be non-reflow type-specific, e.g., red for headers or footers, blue for graphs, magenta for tables, etc. Alternatively, while under some circumstances it is very beneficial to display the confidence rating with a non-reflow block of content, the confidence rating may provide the basis for prejudicing the manual evaluation and editing process, where an unbiased opinion is required. Accordingly, displaying the confidence rating, in whatever form, should be viewed as optional and not mandatory.

In an alternative embodiment (not shown), the manual evaluation and editing process may be carried out through a service. More particularly, the non-reflow block of content, as well as other related information such as, but not limited to, its type, the context (e.g., location, dimensions) from the digital image 100 from which it was taken, the confidence rating, and the digital image, as well as description of what is wanted, are posted to a location where service providers (in the sense of being able to perform the service requested) bid on or accept offers to perform the requested actions. In this instance, the non-reflow block of content may be posted to this type of service to have a service provider manually evaluate the content of the non-reflow block to determine whether any content was erroneously included. Information from the manual evaluation is then returned to the process.

If the confidence rating assigned to the current non-reflow block of content meets or exceeds the predetermined threshold, or after triggering a manual evaluation and editing process for the non-reflow block of content, the routine 1100 proceeds to end control block 1112. At end control block 1112, the looping process begun at control block 1106 causes a determination to be made as to whether there are any additional identified non-reflow blocks of content to be evaluated. If yes, then the routine 1100 proceeds to control block 1106 where the looping process iterates to the next identified non-reflow blocks of content to be evaluated, as described above. If no, the exemplary routine 1100 terminates.

Those skilled in the art will appreciate that manual edits/corrections to non-reflow blocks could have a significant impact other processed content, both reflow and non-reflow blocks, i.e., some reflow content may have been erroneously included in a non-reflow block of content, Accordingly, while not shown in FIG. 11, after the manual evaluation and editing step is completed and edits were made to one or more non-reflow blocks of content, the digital image 100 is reprocessed, or in other words, the reflow-capable content is reprocessed into reflow content excluding the identified (and edited) non-reflow blocks of content.

While not shown in FIG. 11, in at least one embodiment of the present invention, a particular order may be applied in evaluating the non-reflow blocks of content. More particularly, non-reflow blocks of content falling below their corresponding predetermined threshold may be evaluated in a particular order. For example, non-reflow blocks of content of a particular type, such as headers or footers, whose confidence rating falls below a corresponding predetermined threshold, may be processed prior to other non-reflow blocks of content, such as tables or bulleted lists. Alternatively, non-reflow blocks of content falling below their corresponding predetermined threshold may be processed in an order corresponding to their confidence rating. For example, the highest confidence rated non-reflow blocks are processed first, followed by non-reflow blocks having a lesser confidence rating.

As those skilled in the art will appreciate, once a non-reflow block is manually evaluated and edited, those edits may be similarly applied throughout the document when similar, or substantially similar, circumstances are detected. For example, as headers have the same or similar text that is repeated over numerous pages and assuming that a header was manually evaluated and edited, any changes made to one header may be applicable to other header non-reflow blocks. Of course, frequently headers are not entirely similar, such as when a page number, a chapter number, and the like is included. However, when the content of the non-reflow block is substantially similar, manual edits are quite likely to be applicable. When this similarity or substantial similarity occurs, according to one embodiment, the manual changes/edits to a first non-reflow block of content are automatically applied to other similar non-reflow blocks of content throughout the digital content file.

In addition to processing the digital image 100, as described above, once a digital image 100 is processed into a digital content file, the digital content file may be subjected to further processing, either by the content provider or another party. Frequently, such additional processing is likely directed to further preparing the digital content file for its intended use. For example, a digital content file may be further processed using compression techniques to reduce the storage footprint of the digital content file, or formatting to place the digital content file into a format suitable for display in a viewer and/or offering for sale. Moreover, digital rights management information may be added to control the use of the processed digital content under license.

While illustrative embodiments have been illustrated and described, it will be appreciated that various changes can be made therein without departing from the spirit and scope of the invention.

What is claimed is:

1. A computer system for processing a digital image into reflow content, the computer system comprising:
   a data store; and
   a computing device in communication with the data store and that is operative to:
      obtain a digital image, wherein the digital image includes at least some content suitable for conversion to reflow content;
      identify headers or footers in the digital image;
      process the digital image into reflow content, excluding any content within the identified headers or footers;
      wherein the headers are identified at least in part by locating a topmost one or more lines of content within a page of the digital image that are set apart from other content on the page by white space of a greater amount than is found between paragraphs of the reflow content; and
      wherein the footers are identified at least in part by evaluating a bottommost one or more lines of content within a page of the digital image for at least one aspect indicative of a footer.

2. The computer system of claim 1, wherein the computing device is further operative to:
   identify the headers at least in part by determining whether a portion of content in the topmost one or more lines of content is separated horizontally from another portion of content in the topmost one or more lines of content by a substantial amount of white space.

3. The computer system of claim 1, wherein the computing device is further operative to:
   identify the headers at least in part by determining whether a portion of the topmost one or more lines of content of the page in the digital image is aligned to the left side of the page and a portion of the topmost one or more lines of content of the page is aligned to the right side of the page.

4. The computer system of claim 1, wherein the computing device is further operative to:
   identify the headers at least in part by determining whether the topmost one or more lines of content of the page in the digital image are horizontally centered on the page.

5. The computer system of claim 1, wherein the computing device is further operative to:
   identify the headers at least in part by determining whether at least one of the topmost one or more lines of content is repeated over multiple pages in the digital image, with the alignment of the at least one line of content alternating left and right over the multiple pages.

6. The computer system of claim 1, wherein to evaluate the bottommost one or more lines of content for at least one aspect indicative of a footer, the computing device is further operative to:
   determine whether the bottommost one or more lines of content is set apart from other content on the page by white space of a greater amount than is found between paragraphs of content on the page.

7. The computer system of claim 1, wherein to evaluate the bottommost one or more lines of content for at least one aspect indicative of a footer, the computing device is further operative to:
   determine whether a portion of content in the bottommost one or more lines of content is separated horizontally from another portion of content in the bottommost one or more lines of content by a substantial amount of white space.

8. The computer system of claim 1, wherein to evaluate the bottommost one or more lines of content for at least one aspect indicative of a footer, the computing device is further operative to:
   determine whether a portion of the bottommost one or more lines of content of the page in the digital image is aligned to the left side of the page and a portion of the bottommost one or more lines of content of the page is aligned to the right side of the page.

9. The computer system of claim 1, wherein to evaluate the bottommost one or more lines of content for at least one aspect indicative of a footer, the computing device is further operative to:
   determine whether the bottommost one or more lines of content of the page in the digital image are horizontally centered on the page.

10. The computer system of claim 1, wherein to evaluate the bottommost one or more lines of content for at least one aspect indicative of a footer, the computing device is further operative to:
    determine whether horizontal alignment of the bottommost one or more lines of content alternates left and right over multiple pages.

11. A computer-implemented method for processing a digital image into reflow content, the computer-implemented method comprising:
as implemented by one or more computing devices configured with specific executable instructions,
obtaining a digital image including at least some content suitable for conversion to reflow content;
identifying headers or footers in the digital image;
processing the digital image into reflow content, excluding any content from the identified headers or footers;
wherein the headers are identified at least in part by evaluating a topmost one or more lines of content within a page of the digital image for at least one aspect indicative of a header; and
wherein the footers are identified at least in part by locating a bottommost one or more lines of content within a page of the digital image that are set apart from other content on the page by white space of a greater amount than is found between paragraphs of the reflow content.

12. The computer-implemented method of claim 11, wherein the headers are identified at least in part by determining whether portions of content in the topmost one or more lines of content are separated horizontally by a substantial amount of white space.

13. The computer-implemented method of claim 11, wherein the headers are identified at least in part by determining whether a portion of the topmost one or more lines of content of the page in the digital image is aligned to the left side of the page and a portion of the topmost one or more lines of content of the page is aligned to the right side of the page.

14. The computer-implemented method of claim 11, wherein the headers are identified at least in part by determining whether the topmost one or more lines of content is set apart from other content on the page by white space of a greater amount than is found between paragraphs of content on the page.

15. The computer-implemented method of claim 11, wherein the footers are identified at least in part by determining whether portions of content in the bottommost one or more lines of content are separated horizontally by a substantial amount of white space.

16. A non-transitory computer-readable medium having computer-executable instructions stored thereon for processing a digital image into reflow content, the computer-executable instructions comprising:
obtaining a digital image, wherein the digital image includes at least some content suitable for conversion to reflow content;
identifying headers or footers in the digital image;
processing the digital image into reflow content, excluding any content within the identified headers or footers;
wherein the headers are identified at least in part by locating a topmost one or more lines of content within a page of the digital image that are separated by white space of a greater amount than is found between paragraphs of the reflow content; and
wherein the footers are identified at least in part by evaluating a bottommost one or more lines of content within a page of the digital image for at least one aspect indicative of a footer.

17. The non-transitory computer-readable medium of claim 16, wherein the footers are identified at least in part by determining whether portions of content in the bottommost one or more lines of content are separated horizontally by a substantial amount of white space.

18. The non-transitory computer-readable medium of claim 16, wherein the headers are identified at least in part by determining whether portions of content in the topmost one or more lines of content are separated horizontally by a substantial amount of white space.

19. The non-transitory computer-readable medium of claim 16, wherein the headers are identified at least in part by determining whether a portion of the topmost one or more lines of content of the page in the digital image is aligned to the left side of the page and a portion of the topmost one or more lines of content of the page is aligned to the right side of the page.

20. The non-transitory computer-readable medium of claim 16, wherein the footers are identified at least in part by determining whether a portion of the bottommost one or more lines of content of the page in the digital image is aligned to the left side of the page and a portion of the bottommost one or more lines of content of the page is aligned to the right side of the page.

21. A computer-implemented method for processing a digital image into reflow content, the computer-implemented method comprising:
as implemented by one or more computing devices configured with specific executable instructions,
obtaining a digital image, wherein the digital image includes at least some content suitable for conversion to reflow content;
identifying headers or footers in the digital image;
processing the digital image into reflow content, excluding any content within the identified headers or footers;
wherein the headers are identified at least in part by locating a topmost one or more lines of content within a page of the digital image that are set apart from other content on the page by white space of a greater amount than is found between paragraphs of the reflow content; and
wherein the footers are identified at least in part by evaluating a bottommost one or more lines of content within a page of the digital image for at least one aspect indicative of a footer.

22. The computer-implemented method of claim 21, further comprising identifying at least one of the headers by determining whether portions of content in the topmost one or more lines of content are separated horizontally by a substantial amount of white space.

23. The computer-implemented method of claim 21, wherein evaluating the bottommost one or more lines of content for at least one aspect indicative of a footer comprises determining whether the bottommost one or more lines of content within the page of the digital image are horizontally centered on the page.

* * * * *